Jan. 1, 1924

A. P. LEGENDRE

SQUEEZING APPLIANCE

Filed Oct. 4, 1921

1,479,101

Inventor
Alphonse P. Legendre
By William Clinton
Attorney

Patented Jan. 1, 1924.                                                          1,479,101

UNITED STATES PATENT OFFICE.

ALPHONSE PROSPER LEGENDRE, OF FITCHBURG, MASSACHUSETTS.

SQUEEZING APPLIANCE.

Application filed October 4, 1921. Serial No. 505,225.

*To all whom it may concern:*

Be it known that I, ALPHONSE P. LEGENDRE, a subject of the King of Great Britain, residing at Fitchburg, in the State of Massachusetts, in the United States of America, have invented certain new and useful Improvements in Squeezing Appliances; and I do hereby declare that the following is a full, clear, and exact description of the invention, such as will enable others skilled in the art to which it appertains to make and use the same.

The present invention relates to new and useful improvements in appliances for squeezing the contents from flexible containers.

The primary object of the invention is the provision of a device such as above referred to, comprising a pair of rollers between which a flexible tube for containing tooth-paste or the like may be drawn for the purpose of squeezing the contents therefrom.

Another object of the invention is the provision of a device such as above referred to in which the rollers are removably mounted so that they can be removed for repairing or the like.

Still another object of the invention is the provision of a device such as above referred to, which will be comparatively simple and inexpensive to manufacture, reliable and efficient in use, and readily operated.

With the above and other objects in view, the present invention resides in the novel features of construction, formation, combination and arrangement of parts to be hereinafter more fully described, claimed and illustrated in the accompanying drawing forming a part of the present application, and in which:

Figures 1, 2:
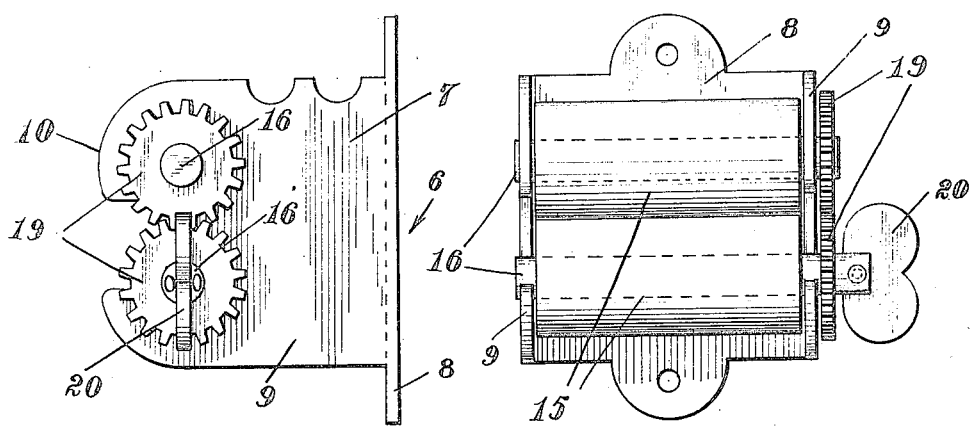
Figure 1 is a side view of one form of the invention.
Figure 2 is an end view thereof.

Referring now to the accompanying drawing, by corresponding characters of reference throughout the several views, the numeral 6 designates in general my improved invention, which comprises a frame 7. This frame 7 consists of a base plate 8 upon the opposite edges of which are formed integral side members 9.

The forward ends of the side members are curved as at 10 and provided with a suitable cut away portion 11, which is extended upwardly and downwardly as at 12 and 13 beyond the adjacent edges of the opening 14, in order that the rollers may be removably mounted therein.

The rollers 15 are carried by suitable shafts 16 the ends of which are journaled in the curved portions or extensions 12 and 13 above referred to, while the said rollers are provided with suitable flexible coverings 17 between which the flexible tube 18 is designed to be squeezed for the purpose of removing the contents therefrom.

The outer ends of the shaft 16 may be provided with intermeshing gears 19 which ensures their movement in opposite directions and one of the said shafts may be engaged by a key 20 by means of which both the shafts and the rollers are rotated in opposite directions.

Figures 4, 5:
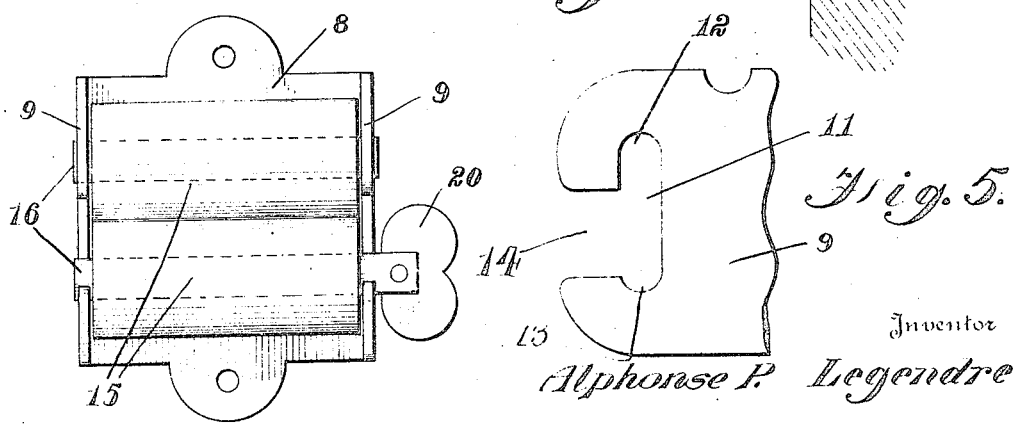
Figure 4 is a view similar to Figure 2 showing a modified form of the invention with the gears removed; and, Figure 5 is a detail view of one of the side members.

In Figure 4 of the drawing which illustrates a modification of the invention, the gears 19 may be dispensed with and the rollers operating in reverse directions by the flexible engagement of the removable covers 17.

Figure 3:
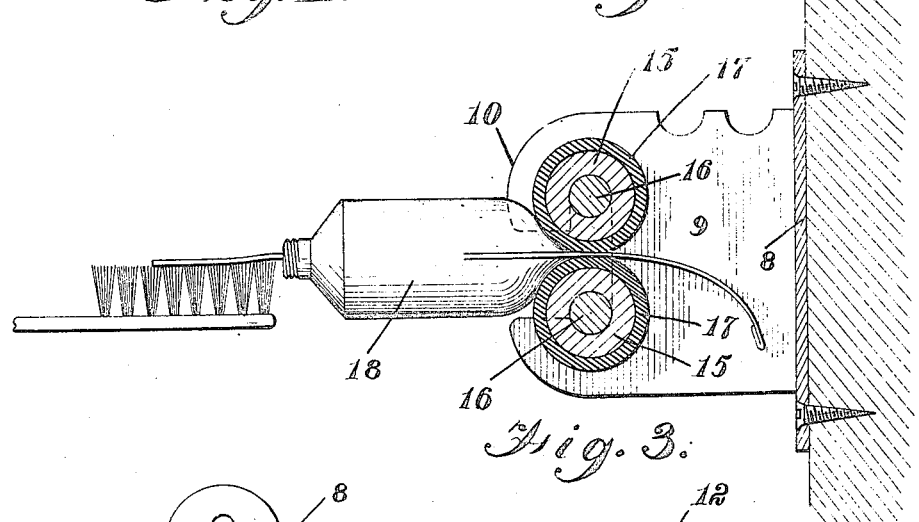
Figure 3 is a longitudinal sectional view thereof.

From the foregoing description, it will be manifest that all that is required is to insert the end of the flexible container shown at 18 between the rollers 15 and turn the same in the desired direction which draws the flexible tube therethrough, squeezing the contents therefrom, as clearly illustrated in the Figure 3.

From the foregoing description it will be manifest that a device for removing the contents from flexible containers such as tubes and the like is provided which will fulfil all of the necessary requirements of such a device, and it should be understood in this connection, that various minor changes in the specific details of construction can be resorted to within the scope of the appended claims, without departing from the spirit or sacrificing any of the advantages of the invention.

Having thus fully described the invention, what I claim as new and desire to secure by Letters Patent is:

1. A squeezing device including a back, a pair of side members formed at the edges thereof and substantially perpendicular thereto, one of said members having a slot formed therein, a pair of parallel shafts supported by said sides and each having one end seated in an end of the slot, contacting rollers carried by said shafts, and an opening extending from the slot through the edge of the member.

2. A squeezing device including a back, a pair of side members formed at the edges thereof and substantially perpendicular thereto, each of said members having a slot therein, a pair of parallel shafts having their ends seated in the ends of said slots, contacting rollers carried by said shafts, and an opening extending from each slot through the edge of the corresponding side member.

In witness whereof I have hereunto set my hand.

ALPHONSE PROSPER LEGENDRE.